United States Patent [19]

Edwards

[11] Patent Number: 4,653,345
[45] Date of Patent: Mar. 31, 1987

[54] SINGLE CONTROL, MECHANICAL VARIABLE SPEED DRIVE

[75] Inventor: Douglas F. Edwards, Mt. Vernon, Ohio

[73] Assignee: The J. B. Foote Foundry Co., Fredericktown, Ohio

[21] Appl. No.: 739,670

[22] Filed: May 31, 1985

[51] Int. Cl.⁴ .................. F16H 37/08; F16H 5/06; B60K 20/00

[52] U.S. Cl. ............... 74/700; 74/665 GC; 74/665 GE; 74/473 R; 74/337.5

[58] Field of Search ........ 74/701, 689, 665 F, 74/665 G, 665 GB, 665 GC, 665 GE, 665 H, 665 T, 670, 694, 700, 359, 366, 473 R, 337.5, 378; 474/10, 19, 37, 32

[56] References Cited

U.S. PATENT DOCUMENTS

| | | | |
|---|---|---|---|
| 1,501,705 | 7/1924 | Decoux | 474/37 |
| 2,933,952 | 4/1960 | Schow | 74/689 |
| 3,091,132 | 5/1963 | Mayfield et al. | 474/32 |
| 3,128,636 | 4/1964 | Graybill | 74/689 |
| 3,195,364 | 7/1965 | Pauli | 474/19 |
| 3,279,270 | 10/1966 | Pacak | 474/19 |
| 3,370,485 | 2/1968 | Carawan | 74/689 |
| 3,552,232 | 1/1971 | Kress | 74/689 |
| 3,678,770 | 7/1972 | Enters et al. | 74/473 R X |
| 4,103,566 | 8/1978 | von Kaler et al. | 74/701 |
| 4,534,748 | 8/1985 | Steig et al. | 474/19 X |

FOREIGN PATENT DOCUMENTS 613005 1/1961 Canada ................ 474/19

Primary Examiner—Leslie Braun
Assistant Examiner—David Novais
Attorney, Agent, or Firm—Allen D. Gutchess, Jr.

[57] ABSTRACT

A mechanical, infinitely variable speed drive is provided with reverse actuation and a single control lever. The drive includes a shaft with an output gear and two driven, face-to-face bevel gears. Shifting mechanism connects either or neither bevel gear to the shaft. A drive bevel gear engages both driven bevel gears and is driven through variable speed pulleys. A cam plate operates the shifting mechanism and a cam manipulates the variable speed pulleys. Both the cam plate and the cam are controlled by a single control lever. The output can be through a differential with the bevel gear shaft being hollow and rotatably mounted on one of the axles of the differential.

18 Claims, 5 Drawing Figures

SINGLE CONTROL, MECHANICAL VARIABLE SPEED DRIVE

This invention relates to a mechanical variable speed drive with reverse actuation and with shifting and speed controlled through a single control lever.

Infinitely variable speed drives with reverse actuation as heretofore known commonly have been of the hydraulic type, the costs of which preclude their use in many applications.

The present invention provides a mechanical, infinitely variable speed drive which has most of the advantages of a hydraulic drive without the high costs. The mechanical drive according to the invention enables infinite variation in output speed without reducing engine speed. The new drive also features a single control lever which, through control means, achieves infinitely variable speeds in both forward and reverse directions. The control lever controls a cam which actuates a variable speed pulley and a cam plate which enables shifting of the drive among forward, neutral, and reverse positions.

The variable speed drive includes a shaft with an output gear rotatable therewith. First and second driven bevel gears and rotatably mounted on the shaft with the teeth facing one another and with a neutral collar therebetween. Shifting mechanism includes a draw key having two positions in which the first or second driven bevel gears are connected for rotation with the shaft and a third, neutral position under the collar. A drive bevel gear engages both of the driven bevel gears and is driven at variable speeds by driven and drive variable speed pulleys. A cam varies the effective diameter of one of the variable speed pulleys and a cam plate shifts the shifting mechanism among the three positions. Both the cam and the cam plate are operated through a single control lever so that both speed and shifting are achieved thereby.

The output gear on the shaft can drive a ring gear on a differential through another gear train. The shaft on which the driven bevel gears and the output gear are mounted can be hollow and rotatably mounted on one of the two output axles of the differential. This provides a relatively compact and lower cost drive mechanism than if the shaft were separate and axially spaced from the output axle.

It is, therefore, a principal object of the invention to provide a mechanical variable speed drive, the speed and shifting of which are controlled by one control lever.

Another object of the invention is to provide an infinitely variable speed drive with forward and reverse actuation having lower costs than may variable speed drives heretofore known.

A further object of the invention is to provide a variable speed drive which includes a hollow shaft having driven gears and an output gear thereon and a differential having an output axle on which the hollow shaft is rotatably mounted.

Many other objects and advantages of the invention will be apparent from the following detailed description of a preferred embodiment thereof, reference being made to the accompanying drawings, in which.

Figure 1:
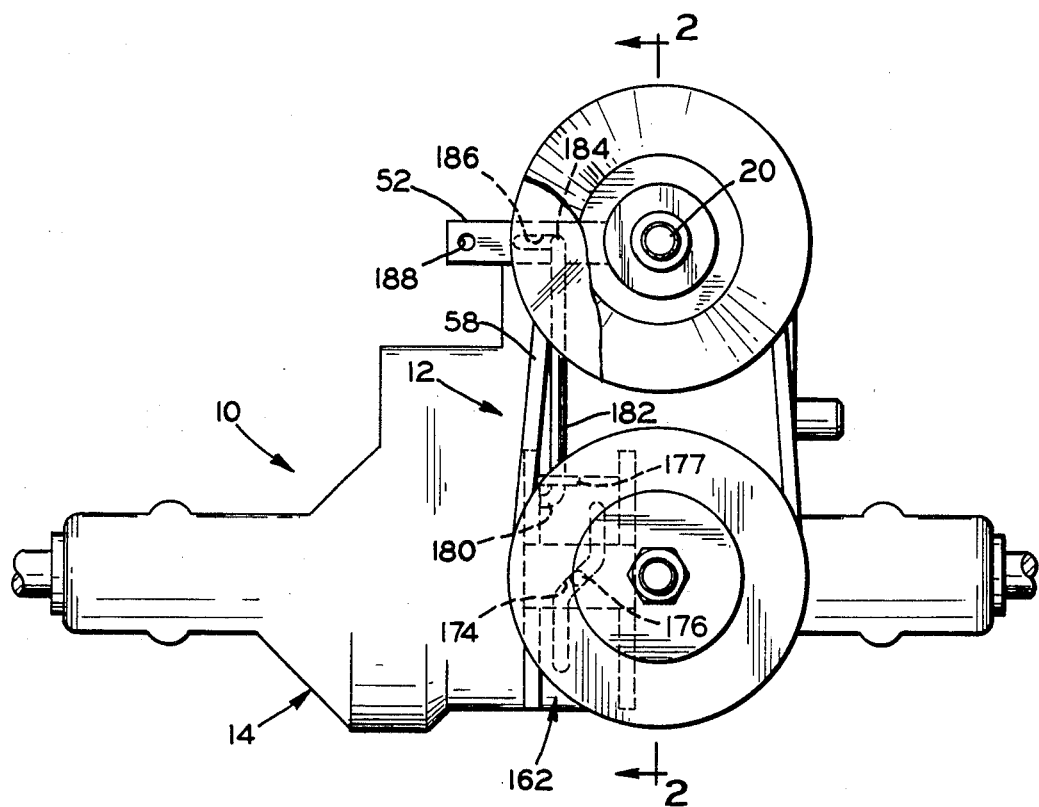
FIG. 1 is a somewhat schematic plan view of a transaxle and a variable speed drive in accordance with the invention.
Figure 4:
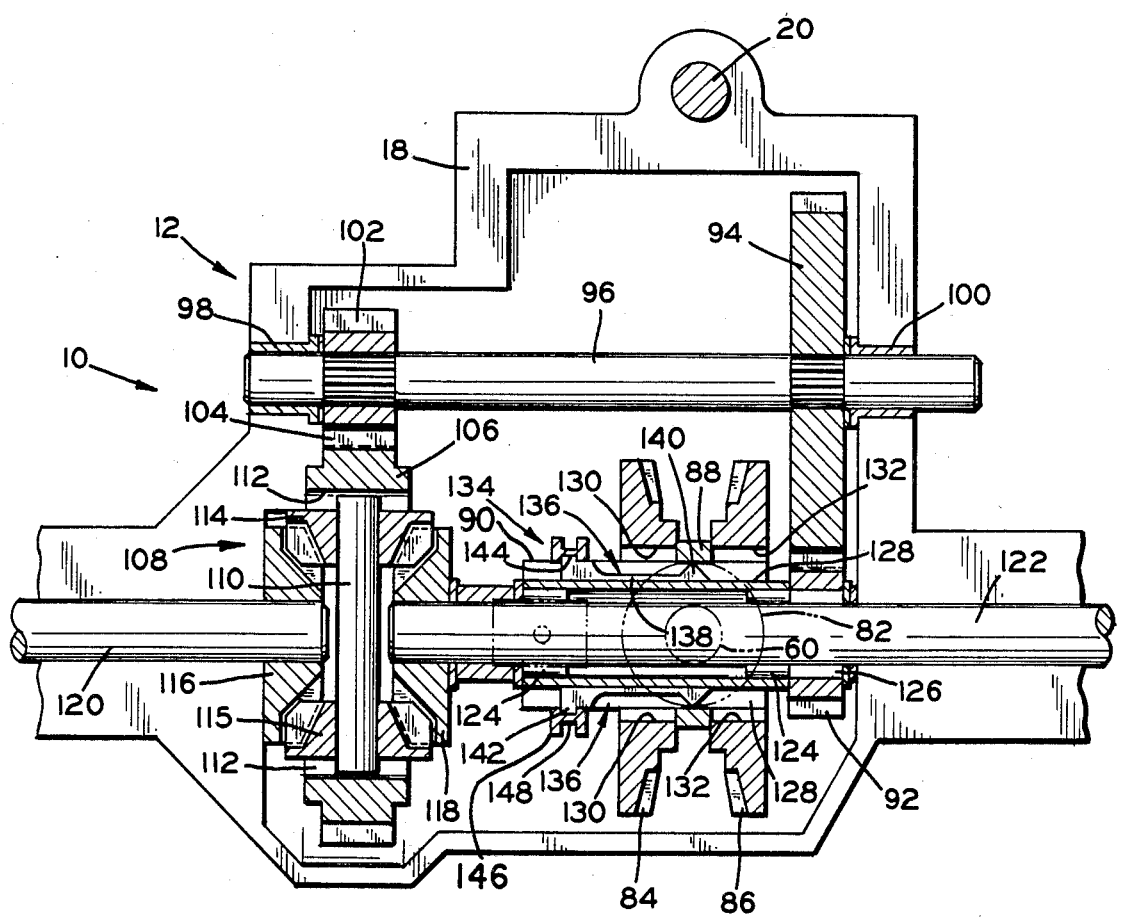
FIG. 4 is a somewhat schematic view in horizontal section taken through the transaxle of FIG. 1.

Referring to FIG. 1, a transaxle indicated at 10 embodies a variable speed drive, indicated generally at 12, in accordance with the invention. The transaxle includes a housing 14 having an upper part 16 (FIG. 2) and a mating lower part 18 (FIG. 4).

Figure 2:
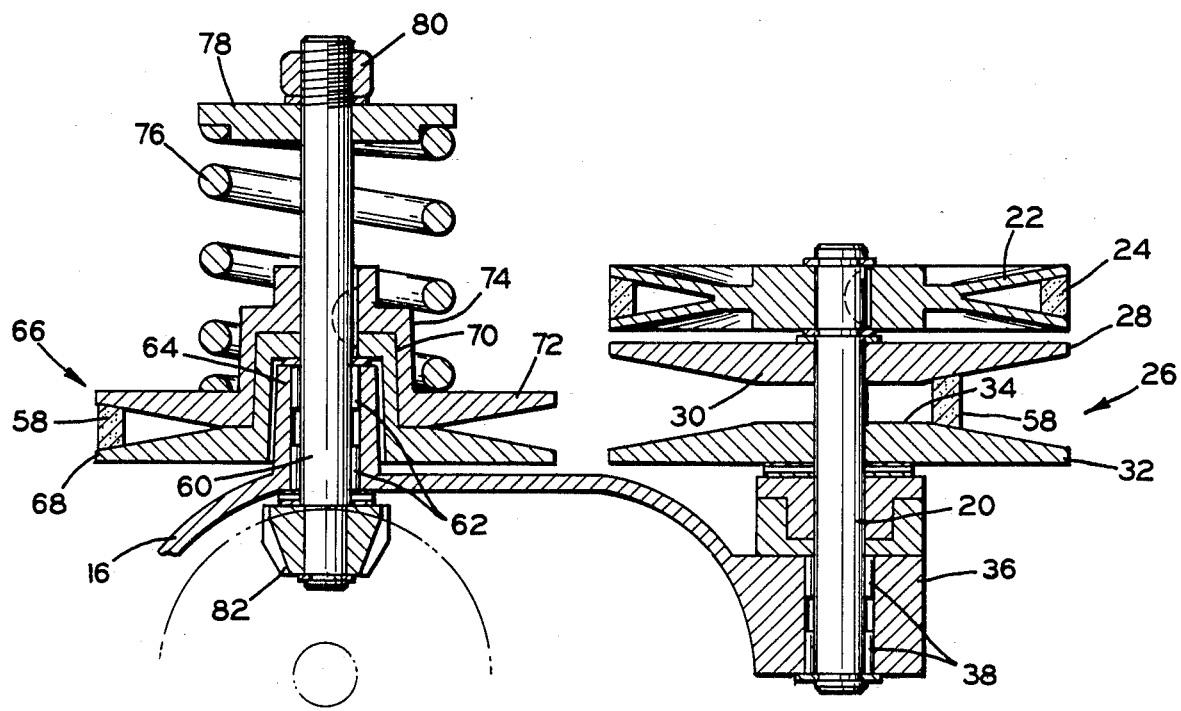
FIG. 2 is a somewhat schematic view in vertical section taken along the line 2—2 of FIG. 1.

Referring particularly to FIG. 2, a first drive pulley shaft 20 has an upper drive pulley 22 affixed thereto, the pulley being connected by a suitable belt 24 to an engine of a riding mower, by way of example. A first variable speed pulley 26 is located on the shaft 20 below the drive pulley 22. The pulley 26 has a fixed pulley part or flange 28 including a hub 30 which is keyed to and rotatable with the shaft 20. The pulley 26 also has a movable pulley part or flange 32 including a hub 34 which is movable on the shaft 20 toward and away from the fixed pulley part 28.

The shaft 20 is rotatably supported in a boss 36 of the upper housing part 16 through bearings 38. A fixed cam member 40 is located on the boss 36 and has a flat surface 42 with a pair of upwardly extending ramps 44 and 46 on either side thereof. The ramps face one another and are slightly concave. There are four of the flat surfaces 42 and four pair of the ramps 44 and 46 extending around the fixed cam member 40.

A movable cam member 48 is located on the fixed cam member 40 with the shaft 20 extending centrally therethrough. The cam member 48 has flat surfaces 50 with ramps 52 and 54 extending therefrom and facing the ramps 44 and 46. The ramps 52 and 54 face away from one another and are slightly concave, as shown. A control arm 56 extends radially outwardly from the movable cam member 48 and can be moved manually or by any suitable remote control to rotate the cam member 48 relative to the cam member 40.

With the ramps of the cam members 40 and 48 fully nesting, as shown, the pulley flanges 32 and 28 are in their maximum spaced condition with a pulley belt 58 located in its innermost position toward the pulley hubs. When the extremities of the ramps 44 and 52 are in engagement, the pulley flanges 32 and 28 will be in their closest condition with the pulley belt 58 near the extremities of the flanges. With the extremities of the ramps 46 and 54 in engagement, the pulley flanges 32 and 28 again will be in their closest condition with the pulley belt 58 again near the extremity of the flanges. However, in this instance, the crank will have been pivoted through an arc of about 90° from the position in which the extremities of the ramps 44 and 52 are in engagement.

A second, driven pulley shaft 60 (FIG. 2) is rotatably supported by bearings 62 in a boss 64 of the housing part 16. A driven variable speed pulley 66 is located on the shaft 60 and includes a fixed pulley part or flange 68 having a hub 70. A movable pulley part or flange 72 includes a hub 74 located around the hub 70, both hubs being tapered so that the movable pulley flange 72 can readily move toward and away from the fixed pulley flange 68. The movable flange 72 is urged toward the fixed one by a coil spring 76 having one end seated against the flange 72 and the other end seated against a ring 78 which is backed up by a nut 80 on the shaft 60.

A drive bevel gear 82 is affixed to the lower end of the driven shaft 60 within the transaxle housing. The rotational speed of the bevel gear 82 varies infinitely from a maximum speed when the extremities of the ramps 44 and 52 are in engagement to a minimum speed when the extremities of the ramps 44 and 46 engage the flat surfaces 50 of the movable cam member 48, at which time the extremities of the ramps 52 and 54 also engage the flat surfaces 42 of the fixed cam member 40. At this time, the pulleys 26 and 66 are in the positions shown in FIG. 2. The rotational speed of the bevel gear 82 then increases to a maximum again when the extremities of the ramps 46 and 54 move into engagement. By way of example, with a riding mower, the lineal speed of the mower can be three miles per hour when the bevel gear 82 is rotating at its fastest speed and the lineal speed of the mower can be one mile per hour when the bevel gear 82 is rotating at its slowest speed.

Referring more particularly to FIG. 4, the drive bevel gear 82 is in constant meshing engagement with teeth of two driven bevel gears 84 and 86. The teeth of the driven bevel gears face one another and the gears are spaced apart by a neutral collar or ring 88. The three are rotatably mounted on a hollow main shaft 90. An output pinion gear 92 is located at one end of the shaft 90 and is suitably affixed thereto to rotate therewith. For other applications, the pinion gear 92 can be in the form of other output members, such as a pulley or sprocket, for example. In this instance, a driven spur gear 94 meshes with the pinion gear 92 and is suitably affixed to a second shaft 96 rotatably mounted by bearings 98 and 100 in the transaxle housing.

An additional spur gear 102 is affixed to the shaft 96 and rotates therewith when the gear 94 is driven. The gear 102 meshes with a ring gear 104 on the periphery of a differential body 106 of a differential indicated at 108. An idler shaft 110 is positioned perpendicularly to the axis of rotation of the body 106 in grooves 112 of the body. First and second miter or bevel gears 114 and 115 are rotatably mounted on end portions of the shaft 110 and mesh with third and fourth miter or bevel gears 116 and 118. The bevel gear 116 is affixed to an axle 120 which is rotatably supported in the transaxle housing and can extend outwardly therebeyond to a rear wheel of the mower, for example. The bevel gear 118 is affixed to a second axle 122 which is rotatably supported by the transaxle housing and extends outwardly beyond another portion of the transaxle to another rear wheel of the mower, for example.

The hollow shaft 90 is rotatably supported on the axle 122 by bearings 124 and the pinion gear 92 also rotates on the axle through a bearing 126. The shaft 90 has diametrically-opposite, longitudinal-extending grooves 128 therein and the bevel gears 84 and 86 have diametrically-opposite notches 130 and 132 therein. When the grooves 128 and the notches 130 or 132 are keyed together, the bevel gear 84 or 86 rotates with the shaft 90.

Shifting mechanism indicated generally at 134 selectively engages the gear 84 or 86, or neither one, with the shaft. The shifting mechanism includes draw or shift keys 136 located in the grooves 128 for longitudinal movement. Each of the draw keys includes a resilient shank 138 having a lug 140 at one end. A projection 142 at the other end is received in an inner annular groove 144 of a shift collar 146 having an outer annular groove 148. When the collar 146 is moved longitudinally of the shaft, the lug 140 is selectively engaged in the notches 130 and 132 of the bevel gears 84 and 86 to individually connect them with the shaft so as to rotate therewith. When the lug 140 is under the neutral collar 88, neither of the bevel gears is engaged with the shaft. When one of the driven bevel gears 84 and 86 is engaged with the shaft, the pinion gear 92 is driven in one direction at a speed determined by the rotational speed of the drive bevel gear 82. When the other one of the bevel gears 84 and 86 is engaged with the shaft 90, the pinion gear 92 is rotated in the opposite direction, again at a speed determined by the rotational speed of the bevel gear 82. The wheels on the axles 120 and 122 are accordingly driven forwardly or in reverse.

Figure 5:
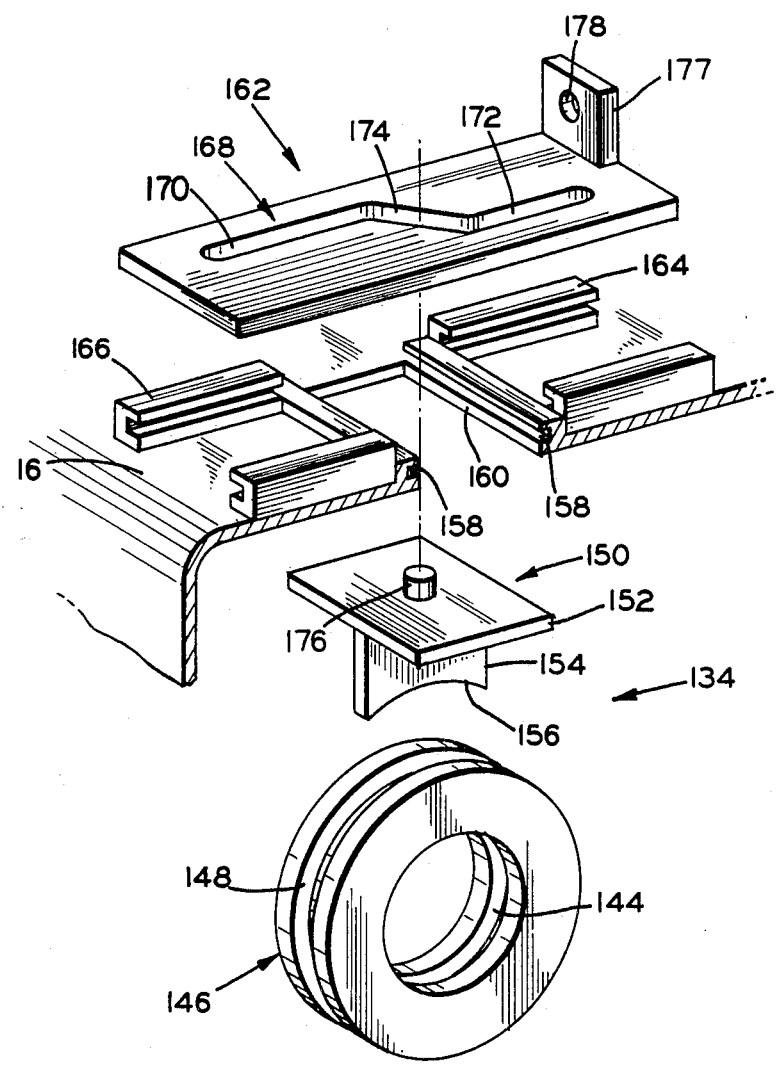
FIG. 5 is an exploded, fragmentary view in perspective of part of the shift mechanism of the variable speed drive.

Referring to FIG. 5, the shifting mechanism 134 also comprises a shifter member or fork 150 including a shifter plate 152 and a depending flange 154 with an arcuate lower edge 156. The edge 156 of the flange 154 is received in the outer groove 148 of the shift collar 146. The shifter plate 152 is directed by guides 158 on the upper housing part 16 for movement longitudinally of the shaft 90 with the flange 154 extending downwardly through an opening 160 in the upper housing part 16. The shifter fork 150 thereby moves the collar 146 to move the draw keys 136 among their three positions.

The shifter fork 150, in turn, is moved by a cam plate 162 which is directed for movement perpendicular to the movement of the shifter plate 152 by guides 164 on the upper housing part 16. The cam plate 162 has a stretched Z-shaped slot or groove 168 therein having two longitudinal, parallel portions 170 and 172 connected by a diagonal portion 174. The slot 168 receives an upwardly-extending projection 176 affixed to the shifter plate 152 and moves the shifter fork 150 a distance longitudinally of the shaft 90 equal to the distance the slot portions 170 and 172 are spaced apart when the cam plate 162 moves longitudinally a distance sufficient to move the projection 176 from one of the slot portions 170 and 172 to the other. With the projection 176 in the slot portion 170, the draw keys 136 are engaged with the bevel gear 84 and when the projection 176 is in the slot portion 172, the draw keys 136 are engaged with the bevel gear 86, when the projection 176 is in the diagonal portion 174 of the slot 168, the draw keys are depressed and under the neutral collar 88.

The cam plate 162 is moved longitudinally when the control lever 56 is pivoted about the axis of the shaft 20. For this purpose, the cam plate 162 has an upwardly extending ear 177 with an opening 178 therein to receive a bent end 180 of a connecting rod 182 (FIG. 1). The rod 182 has another end 184 received in a slot 186 in the control lever 56. An opening 188 in the outer end of the lever 56 can receive an end of a rod, cable, etc. to connect the lever to a remote operating control, if desired, or the lever 56 can be operated manually.

Figure 3:
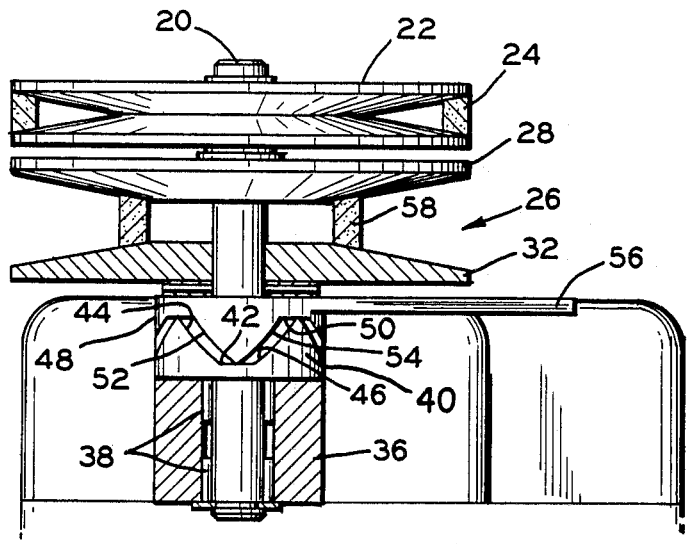
FIG. 3 is a somewhat schematic view partly in elevation of a variable speed pulley shown in FIG. 2.

In operation, with the control lever 56 in the position of FIG. 1, the movable cam member 48 is in the position of FIG. 3 with the cam ramps in nesting relationship and with their peaks or extremities contacting the flat surfaces 42 and 50 of the cam members 40 and 48. The pulley flanges 28 and 32 are then in their most widely spaced condition with the belt 58 closest to the hubs 30 and 34 of the pulley flanges 28 and 32. The drive bevel gear 82 will then be rotating at its slowest speed. At this time, the cam plate 162 is in its middle position with the projection 176 of the shifter fork 150 in the diagonal portion 174 of the slot 168. The lugs 140 of the draw keys 136 are then depressed under the neutral collar 88 with the bevel gears 84 and 86 rotating freely on the shaft 90. The transaxle thus is in neutral.

When the control lever 56 is pivoted to its maximum extent in a clockwise direction in FIG. 1 to a position about 45° above the position shown, the cam ramps will have their extremities mutually engaged such that the extremity of the cam ramp 52 will engage the extremity of the cam ramp 44 to move the pulley flange 32 closest to the pulley flange 28 and move the belt 58 to its maximum peripheral position on the variable speed pulley 26. The drive bevel gear 82 will then be rotated at its maximum speed. The cam plate 162 is simultaneously moved to its maximum position toward the right, as viewed in FIG. 5, with the projection 176 then received in the slot portion 170. The shifter fork 150 is then moved toward the left in the opening 160 and the shift collar 146 is moved toward the left as viewed in FIG. 4. The lugs 140 of the draw keys 136 are then received in the notches 130 of the bevel gear 84, causing the pinion gear 92 to rotate at its maximum speed in one direction. Through the gears 94 and 102 and the differential, the axles 120 and 122 are thus rotated at their maximum speed in one direction.

When the control lever 56 is moved 90° counterclockwise, as viewed in FIG. 1, to its maximum position in the other direction, the extremities of the cam ramps 54 will engage the extremities of the cam ramps 46 to again move the movable pulley flange 32 to its closest position relative to the stationary pulley flange 28 of the variable speed pulley 26. The drive bevel gear 82 is then again rotated at its maximum speed. The cam plate 162 will then be moved to its maximum position toward the left, as viewed in FIG. 5, with the projection 176 then in the slot portion 172 then in the slot portion 172. The shift collar 146 is then moved to the right, as viewed in FIG. 4, to place the lugs 140 of the draw keys 136 in the notches 132 of the bevel gear 86. The pinion gear 92 is then rotated at maximum speed in the opposite direction to rotate the axles 120 and 122 at their maximum speed in the opposite direction.

Intermediate speeds are determined at intermediate portions of the control lever 56 where the cam ramps 44 and 52 or 46 and 54 engage one another to a greater extend than when at the extremities and the movable pulley flange 32 is between its farthest and closest conditions relative to the stationary pulley flange 28.

Various modifications of the above-described embodiment of the invention will be apparent to those skilled in the art and it is to be understood that such modifications can be made without departing from the scope of the invention, if they are within the spirit and the tenor of the accompanying claims.

I claim:

1. A variable speed drive comprising a main shaft, an output member rotatable with said shaft, a first driven bevel gear rotatable on said shaft, a second driven bevel gear rotatable on said shaft and facing said first driven bevel gear, shifting means having a first position connecting said first driven bevel gear with said shaft for rotation therewith, a second, neutral position, and a third position connecting said second driven bevel gear with said shaft for rotation therewith, a drive bevel gear engaging both said first and second driven bevel gears, a driven shaft on which said drive bevel gear is mounted, a variable speed driven pulley on said driven shaft for rotating said drive bevel gear, a drive shaft, a variable speed drive pulley on said drive shaft, a belt connecting said driven and drive pulleys, and control means including a single control lever for changing the effective diameter of one of said drive and driven pulleys and for moving said shifting means among its first, second, and third positions.

2. A variable speed drive according to claim 1 characterized by said control means comprising a cam plate for moving said shifting means, cam means operated by said control lever for changing the effective diameter of said one of said drive and driven pulleys, and means connecting said cam plate and said control lever.

3. A variable speed drive according to claim 2 characterized by said cam means comprising a movable cam member and a stationary cam member, and said lever being affixed to said movable cam member.

4. A variable speed drive according to claim 2 characterized further by said variable speed drive pulley comprising a stationary pulley flange affixed to said drive shaft and a movable pulley flange slidably mounted on said drive shaft, said cam means comprising a stationary cam member through which said drive shaft extends, a movable cam member engagable with said stationary cam member, said drive shaft extending through said movable cam member, said movable cam member being effective to cause said movable pulley flange to move toward and away from said stationary pulley flange when said movable cam member is rotated.

5. A variable speed drive according to claim 1 characterized by said shifting means comprising a draw key, a collar for moving said draw key, and a shifter fork for moving said collar, and said control means comprising a cam plate for moving said shifter fork.

6. A variable speed drive according to claim 5 characterized by cam means operated by said control lever for changing the effective diameter of said one of said drive and driven pulleys, and means connecting said cam plate and said control lever.

7. A variable speed drive according to claim 6 characterized by said cam means comprising a movable cam member and a stationary cam member, and said lever being affixed to said movable cam member.

8. A variable speed drive according to claim 5 characterized by said cam plate having a non-linear slot therein, and said shifter fork having a projection received in said slot.

9. A variable speed drive according to claim 1 characterized by said control means being effective to reduce the rotational speed of said drive bevel gear when causing said shifting means to move to said second position from said first position and to said second position from said third position.

10. A variable speed drive comprising a main shaft, an output gear rotatable with said shaft, a first driven gear rotatable on said shaft, a second driven gear rotatable on said shaft, shifting means having a first position connecting said first driven gear with said shaft for rotation therewith, a second, neutral position, and a third position connecting said second driven gear with said shaft for rotation therewith, a drive gear engaging both said first and second driven gears and rotating said first and second driven gears in opposite directions, a driven shaft on which said drive gear is mounted, a variable speed driven pulley on said driven shaft for rotating said drive gear, a drive shaft, a variable speed drive pulley on said drive shaft, means connecting said driven and drive pulleys, control means including a control lever for changing the effective diameter of one of said drive and driven pulleys and for moving said shifting means among its first, second, and third positions, a differential having two aligned output axles, gear means connecting said output gear and said differential, and said main shaft being rotatably mounted on one of said axles.

11. A variable speed drive according to claim 10 characterized by said control means comprising a cam plate for moving said shifting means, cam means operated by said control lever for changing the effective diameter of said one of said drive and driven pulleys, and means connecting said cam plate and said control lever.

12. A variable speed drive according to claim 11 characterized by said cam means comprising a movable cam member and a stationary cam member, and said lever being affixed to said movable cam member.

13. A variable speed drive according to claim 10 characterized by said shifting means comprising a draw key, a collar for moving said draw key, and a shifter fork for moving said collar, and said control means comprising a cam plate for moving said shifter fork.

14. A variable speed drive comprising a differential body having a rotatable ring gear, an idler shaft carried by said body perpendicular to an axis of rotation of said gear, a first bevel gear rotatably mounted on said idler shaft, a second bevel gear rotatably mounted on said idler shaft, a first axle located on the axis of rotation of said ring gear, a second axle located on the axis of rotation of said ring gear and aligned with said first axle, a third bevel gear affixed to said first axle and meshing with said first and second bevel gears, a fourth bevel gear affixed to said second axle and meshing with said first and second bevel gears, a main, hollow shaft rotatably mounted on said second axle, a first driven bevel gear rotatably mounted on said main shaft, a second driven bevel gear rotatably mounted on said main shaft with the teeth of said first and second driven bevel gears facing one another, a neutral collar on said main shaft between said first and second driven bevel gears, shifting means having a first position connecting said first driven bevel gear for rotation with said main shaft, a second, neutral position, and a third position connecting said second driven bevel gear for rotation with said main shaft, a pinion gear rotatable with said main shaft, and gear means connecting said pinion gear with said ring gear for rotating said ring gear when said pinion gear is rotated, a drive bevel gear meshing with said first and second driven bevel gears and driving said first and second driven bevel gears in opposite directions, and control means including a single control lever for varying the speed of said drive bevel gear and for moving said shifting means among said first, second, and third positions.

15. A variable speed drive according to claim 14 characterized by a driven variable speed pulley connected with said drive bevel gear, a drive variable speed pulley, a belt connecting said driven and drive pulleys, said control means comprising cam means for changing the effective diameter of one of said variable speed drive and driven pulleys, a cam plate for moving said shifting means among said first, second, and third positions, and said lever being connected with said cam means and said cam plate to cause movement of said cam means and said cam plate.

16. A variable speed drive according to claim 14 characterized by said control means being effective to reduce the rotational rate of said drive bevel gear when causing said shifting means to move to said second position from said first position and to said second position from said third position.

17. A variable speed drive according to claim 15 characterized by said variable speed drive pulley comprising a fixed pulley flange and a movable pulley flange, said cam means being effective to cause said movable pulley flange to move toward and away from said fixed pulley flange.

18. A variable speed drive according to claim 16 characterized by said shifting means comprising a draw key rotatable with said shaft, a shift collar on said shaft and connected with said draw key for moving said draw key between the first, second, and third positions, a shifter fork engagable with said collar for moving said collar longitudinally of said shaft, and a cam plate having slot means engagable with said shifter fork for moving said shifter fork in a manner to move said collar longitudinally of said shaft.

* * * * *